United States Patent [19]

Buchner et al.

[11] Patent Number: 5,556,119
[45] Date of Patent: Sep. 17, 1996

[54] CONTROL ARM FOR USE IN A VEHICLE WHEEL SUSPENSION SYSTEM

[75] Inventors: Tomasz Buchner; David E. Kelly, both of St. Catharines, Canada

[73] Assignee: TRW Inc., Lyndhurst, Ohio

[21] Appl. No.: 390,656

[22] Filed: Feb. 17, 1995

[51] Int. Cl.$^6$ ............................................. B60G 3/00
[52] U.S. Cl. ............................. 280/96.1; 280/690
[58] Field of Search ..................... 280/96.1, 673, 280/675, 688, 690, 691, 725

[56] References Cited

U.S. PATENT DOCUMENTS

| | | | |
|---|---|---|---|
| 2,835,521 | 5/1958 | White | 280/96.1 |
| 2,934,350 | 4/1960 | Herbenar | 280/96.1 |
| 2,944,831 | 7/1960 | Thomas | 280/96.1 |
| 4,690,426 | 9/1987 | Kabo et al. | 280/690 |
| 4,848,788 | 7/1989 | Rumpel | 280/675 X |
| 4,981,308 | 1/1991 | Kunert et al. | 280/690 X |
| 5,094,474 | 3/1992 | Ando et al. | 280/675 X |
| 5,098,118 | 3/1992 | Hayashi et al. | 280/691 |

FOREIGN PATENT DOCUMENTS

| | | | |
|---|---|---|---|
| 0031812 | 2/1988 | Japan | 280/675 |
| 2174961 | 11/1986 | United Kingdom | 280/691 |

*Primary Examiner*—Christopher P. Ellis
*Attorney, Agent, or Firm*—Tarolli, Sundheim, Covell, Tummino & Szabo

[57] ABSTRACT

A control arm (30) comprises a first member (32) with a first portion (42) connectable to a vehicle frame (38). A second portion (56) of the first member (32) is connectable to a steering knuckle (14). A connecting portion (64) interconnects the first and second portions (42, 56) of the first member (32). A second member (34) includes a third portion (68) connectable to the vehicle frame (38) and a rod portion (84) extending from the third portion (68). The rod portion (84) includes a terminal end (86) rigidly connected to the connecting portion (64) of the first member (32) to prevent relative movement between said first and second members.

22 Claims, 6 Drawing Sheets

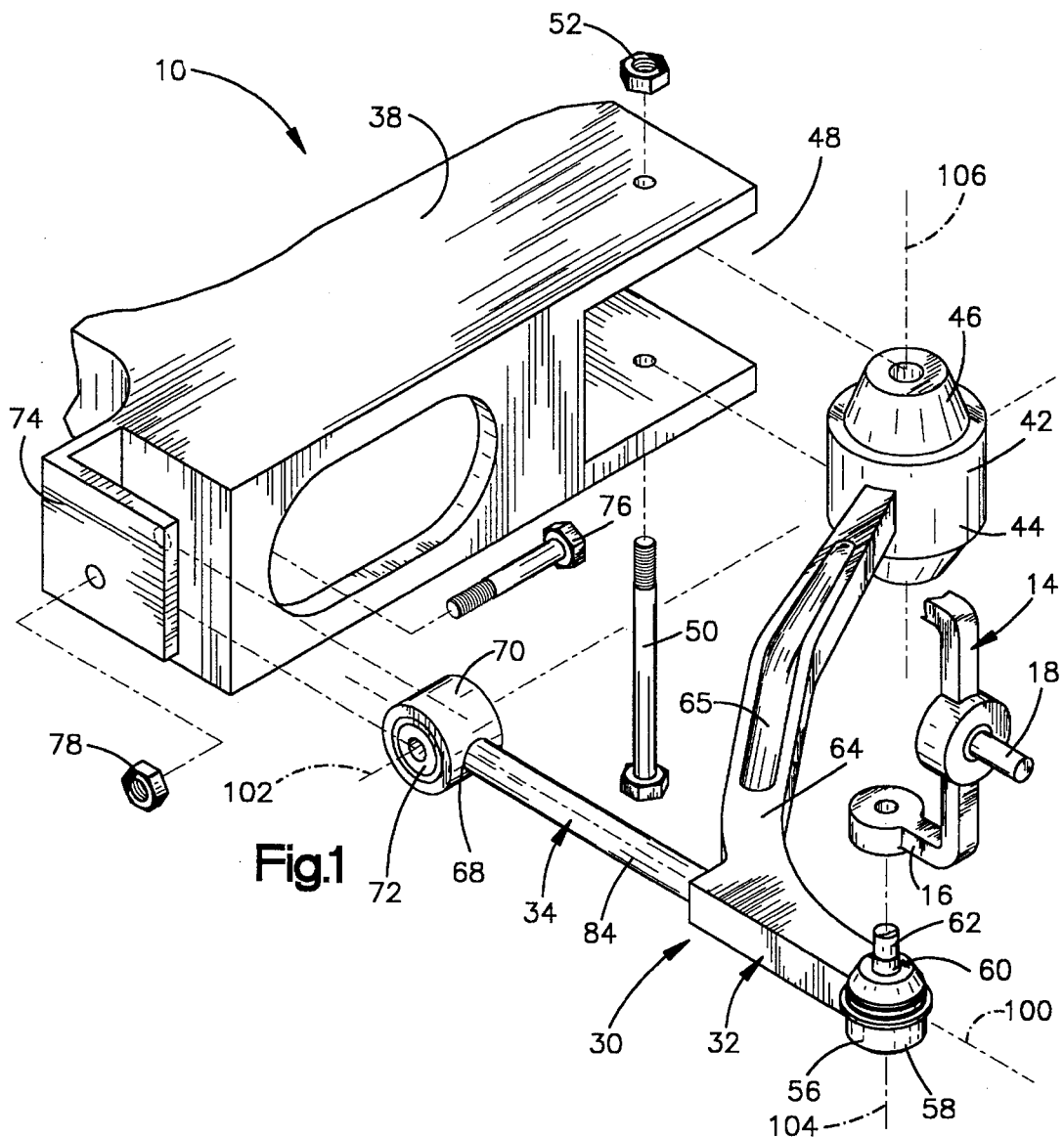
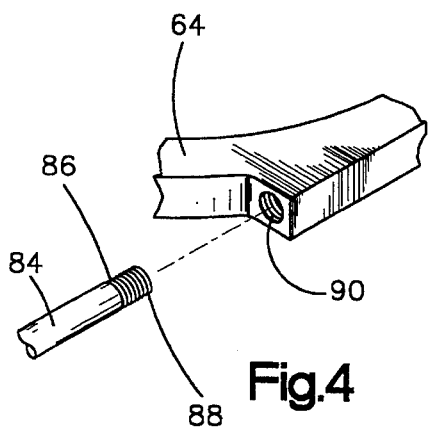
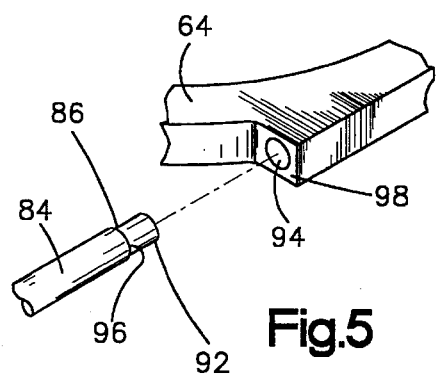

ize: 5,556,119

CONTROL ARM FOR USE IN A VEHICLE WHEEL SUSPENSION SYSTEM

BACKGROUND OF THE INVENTION

The present invention relates to a vehicle wheel suspension system, and is particularly directed to a two-member control arm for use in a vehicle wheel suspension system.

Control arms for use in a vehicle wheel suspension system are known. A typical control arm comprises a one-piece member formed by casting or by forging. The one-piece member includes first and second portions connectable with a vehicle frame and a third portion connectable with a steering knuckle. One piece castings have limited strength. One piece forgings require large presses which are not efficient in the use of raw material, and are expensive. Another known control arm is formed by a plurality of stamping, usually five or six, which are interconnected to form the control arm. Control arms formed of a plurality of stamping are expensive and difficult to manufacture.

In yet another known control arm, a first member is connectable to the vehicle frame and to a steering knuckle. A tension rod is connected to the first member and is connectable to the vehicle frame. The tension rod extends through an opening in a connecting portion of the first member interconnecting opposite ends of the first member. The tension rod extends through bushings to permit relative movement between the first member and the tension rod. A portion of the first member connectable with the vehicle frame is spaced a first distance from a portion of the first member connectable to the steering knuckle. A portion of the tension rod connectable to the vehicle frame is spaced from the portion of the first member connectable to the steering knuckle a second distance greater than the first distance. Thus, the tension rod is substantially longer than the first member. When the known two member control arm is connected to the vehicle frame and the steering knuckle, the tension rod is normally in tension.

SUMMARY OF THE INVENTION

In accordance with the present invention, a control arm for use in a vehicle suspension system comprises a first member with a first portion connectable to a vehicle frame. A second portion of the first member is connectable to a steering knuckle. A connecting portion of the first member interconnects the first and second portions. A second member includes a third portion connectable to the vehicle frame and a rod portion extending from the third portion. The rod portion includes a terminal end rigidly connected to the connecting portion of the first member to prevent relative movement between the first and second members. Preferably, an extension extends from the terminal end of the rod portion and is received in an opening in the connecting portion of the first member to connect the rod portion to the connecting portion of the first member.

The first portion of the first member is spaced from the second portion a first distance. The third portion of the second member is spaced from the second portion of the first member a second distance smaller than the first distance between the first and second portions of the first member. The connecting portion of the first member is substantially longer than the rod portion of the second member. When the control arm is connected to the steering knuckle and the vehicle frame, the second member normally receives compressive loads. Therefore, the rod portion may have a simple construction as compared.

The first and second members are easily manufactured by forging, and easily assembled together. The control arm comprising the first and second members save on the amount of material used for the control arm as compared with a one-piece forging. Also, the control arm is a rigid, strong control arm as compared with the known two-member control arm.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is an exploded schematic view in perspective of a vehicle wheel suspension system embodying a control arm constructed in accordance with a first embodiment of the present invention;

FIG. 4 is an enlarged exploded view of a portion of the control arm of FIG. 1;

FIG. 5 is an enlarged exploded view of a portion of a second embodiment of a control arm, similar to FIG. 4;

DESCRIPTION OF THE PREFERRED EMBODIMENTS

The present invention is directed to a control arm for use in a vehicle wheel suspension system. The specific construction of the control arm may vary. A vehicle wheel suspension system 10 embodying a control arm constructed in accordance with the present invention is shown in FIG. 1.

The vehicle wheel suspension system 10 comprises a steering knuckle 14 (partially shown in FIG. 1) having a lower lever arm portion 16. A spindle portion 18 extends from the steering knuckle 14. A vehicle wheel (not shown) is mountable onto the spindle portion 18 for rotation about the spindle portion.

Figure 2:
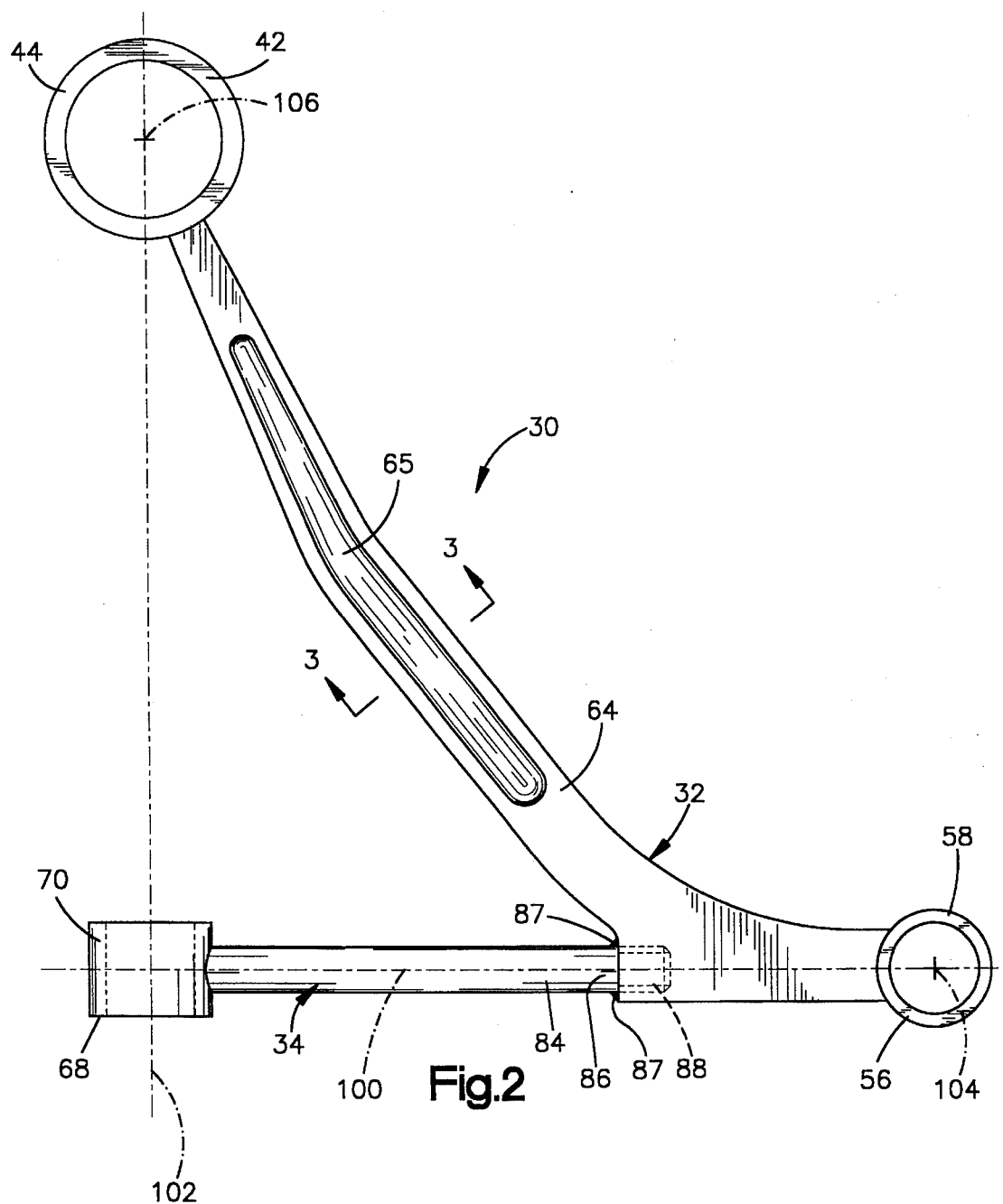
FIG. 2 is a top plan view of the control arm of FIG. 1.

A control arm 30 (FIGS. 1 and 2) includes first and second metal members 32 and 34. The first and second members 32 and 34 are rigidly connected together and connect the steering knuckle 14 to a vehicle frame 38. The first and second members 32 and 34 are prevented from movement relative to each other to provide a rigid, strong control arm.

The first member 32 includes a first portion 42 defining a cylindrical housing 44 through which a rubber bushing 46 extends. The bushing 46 and cylindrical housing 44 are positioned in a recess 48 in the vehicle frame 38. A bolt 50 extends through an opening in the bushing 46 and receives a nut 52 to connect the cylindrical housing 44 to the vehicle frame.

A second portion 56 of the first member 32 defines a socket 58 for receiving a ball stud 60 (FIG. 1). The ball stud 60 and bearing material are positioned in the socket 58 and the walls of the socket are deformed to retain the ball stud and bearing material in the socket, as is well known in the art. A shaft 62 of the ball stud 60 extends through an opening in the lever arm 16 of the steering knuckle 14 to pivotally connect the control arm 30 to the steering knuckle, also, as is well known in the art. Alternatively, the second portion 56 could define a cylindrical housing similar to cylindrical housing 44 and have a ball joint assembly pressed therein, as is well known in the art.

Figure 3:
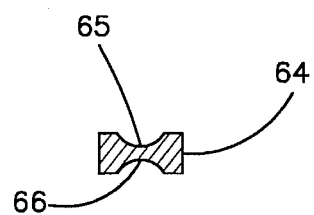
FIG. 3 is a sectional view of a portion of the control arm of FIG. 2, taken generally along the line 3—3 of FIG. 2.

A curved connecting portion 64 (FIGS. 1 and 2) interconnects the cylindrical housing 44 and the socket 58 of the first member 32. The connecting portion 64 has first and second recesses 65 and 66 (FIG. 3) located on opposite sides of the connecting portion. The recesses 65 and 66 of the connecting portion 64 define an I-beam shaped portion of the connecting portion 64. Alternatively, the connecting portion 64 could have a rectangular-shaped cross-section or a cross-section of some other shape. The cylindrical housing 44, the socket 58, and the connecting portion 64, preferably, comprise a one-piece unitary forging or casting made of a homogeneous metal material, preferably steel or aluminum, without welds or other interconnections.

The second member 34 (FIGS. 1 and 2) includes a third portion 68 defining a cylindrical housing 70 for receiving a rubber bushing 72. The cylindrical housing 70 and bushing 72 are connected to the vehicle frame 38 by a clevis 74 on the vehicle frame 38. A bolt 76 extends through an opening in the clevis 74 and an opening in the bushing 72. A nut 78 threadably engages the bolt 76 to connect the cylindrical housing 70 to the vehicle frame 38.

The second member 34 includes a rod portion 84 (FIGS. 2 and 4) extending from the cylindrical housing 70. The rod portion 84 has a terminal end 86 connected to the connecting portion 64 of the first piece 32. The rod portion 84 is preferably a solid metal piece, however the rod portion could be tubular. The cylindrical housing 70 and the rod portion 84 may comprise a one-piece forging made of a homogeneous metal material, preferably steel or aluminum. Alternatively, the rod portion 84 could be welded to the cylindrical housing 70.

A threaded extension 88 extends from the terminal end 86 of the rod portion 84 into a threaded opening 90 in the connecting portion 64 of the first piece 32 to rigidly connect the rod portion to the connecting portion to prevent relative movement between the first and second members 32 and 34. The rod portion 84 is threaded into the opening 90 until the angular position of the cylindrical housing 70 and the distance between the cylindrical housing 70 and the socket 58 is as desired.

The terminal end 86 is, preferably, welded at 87 to the connecting portion 64 after the extension 88 is threaded into the opening 90. The weld 87 fixedly connects the rod portion 84 to the connecting portion 64. Alternatively, the connecting portion 64 may be deformed or crimped around the opening 90 instead of, or along with, welding the terminal end 86 to the connecting portion to fixedly secure the terminal end to the connecting portion. Also, a jam nut (not shown) could be threaded on the extension 88 into engagement with the connecting portion to lock the rod portion 84 to the connecting portion 64. Accordingly, the rod portion 84 is rigidly and fixedly connected to the connecting portion 64 of the first member 32 to prevent relative movement between the first member 32 and the second member 34.

The rod portion 84 of the second member 34 has a longitudinal axis 100 (FIGS. 1 and 2) extending perpendicular to a horizontal axis 102 of the cylindrical housing 70 and intersecting a vertical axis 104 of the socket 58. The axis 102 of the cylindrical housing 70 also extends perpendicular to an axis 106 of the cylindrical housing 44 of the first member 32 and intersects the axis of the cylindrical housing 44. The axis 104 of the socket extends parallel to the axis 106 of the cylindrical housing 44 and perpendicular to the axis 100 of the rod portion 84.

The first portion 42 of the first member 32 is spaced a first distance from the second portion 56. The third portion 68 of the second member 34 is spaced from the second portion 56 of the first member 32 a second distance smaller than the first distance between the first and second portions 42 and 56 of the first member. Accordingly, the connecting portion 64 of the first member 32 is substantially longer than the rod portion 84 of the second member 34. When the control arm 30 is connected to the steering knuckle 14 and the vehicle frame 38, the second member 34 normally receives compressive loads. Therefore, the rod portion 84 may have a simple construction.

Although the first portion 42 of the first piece 32 and the third portion 68 of the second piece 34 are shown as receiving bushings 46 and 72, respectively, the first portion and third portion may receive cross-axis ball joints. The ball joints connect the first and second pieces 32 and 34 to the vehicle frame, as is well known in the art.

FIG. 5 shows another way to rigidly and fixedly connect the first member 32 to the second member 34. An extension 92 (FIG. 5) extends from the terminal end 86 of the rod portion 84. The extension 92 has a diameter which is larger than the diameter of an opening 94 in the connecting portion 64 and is press fit into the opening. The diameter of the extension 92 is smaller than the diameter of the rod portion 84 to define a shoulder 96 on the rod portion.

The shoulder 96 has a flat surface which engages a flat surface 98 on the connecting portion 64 when the extension 92 is press fit into the opening 94 to rigidly connect the rod portion 84 to the connecting portion. The terminal end 86 is, preferably, welded to the connecting portion 64 after the extension 92 is press fit in the opening 94 to fixedly connect the rod portion 84 to the connecting portion 64. Alternatively, the connecting portion 64 may be deformed or crimped around the opening 94 to fixedly secure the terminal end 86 to the connecting portion instead of, or along with, welding.

Figure 6:
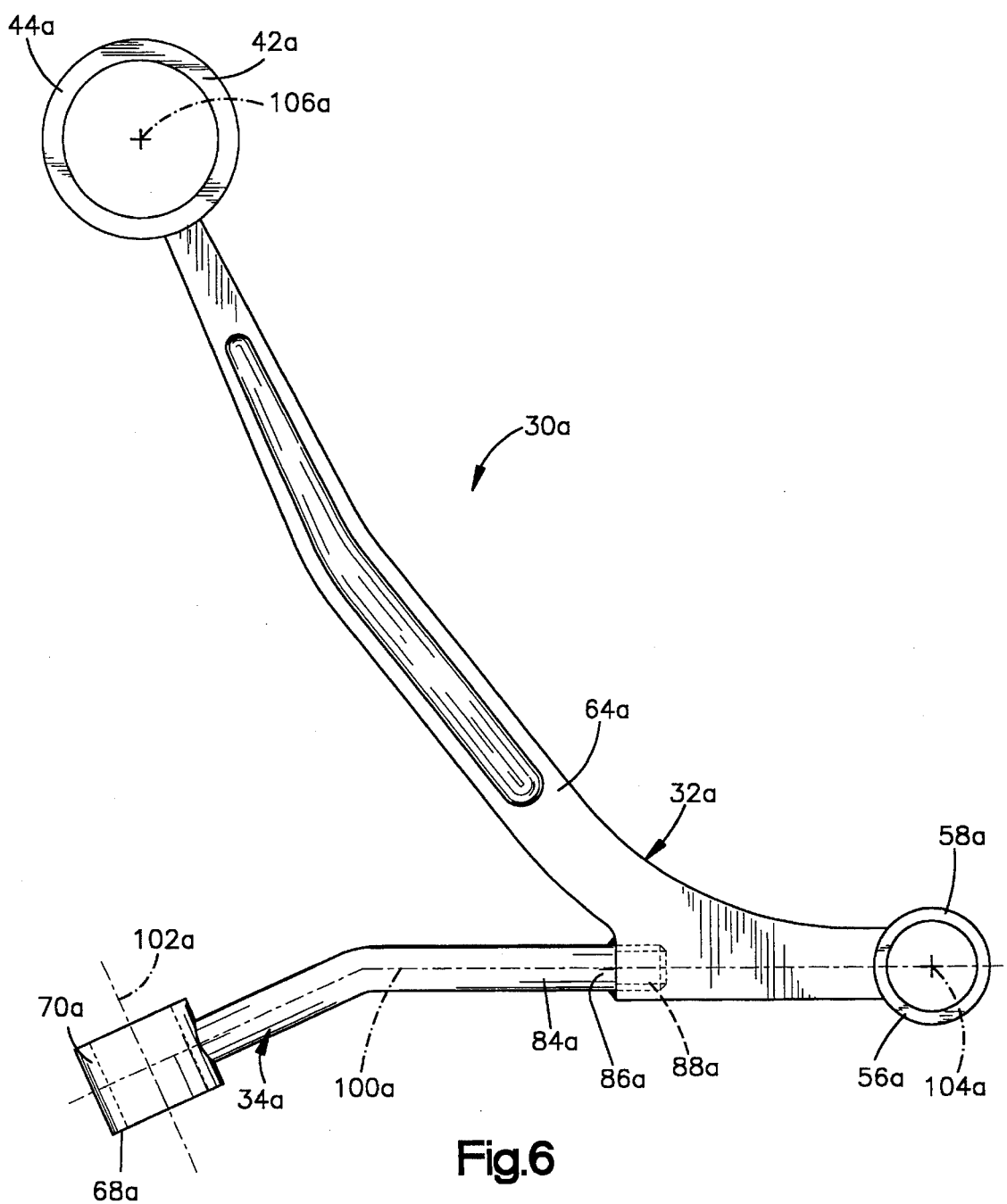
FIG. 6 is a top plan view of a third embodiment of a control arm, similar to FIG. 2.

In the embodiment of the invention illustrated in FIGS. 1–4, the rod portion is straight. In the embodiment of the invention illustrated in FIG. 6, the rod portion is bent or curved. Since the embodiment of the invention illustrated in FIG. 6 is generally similar to the embodiment of the invention illustrated in FIGS. 1–4, similar numerals will be utilized to designate similar components, suffix letter "a" being associated with the numerals of FIG. 6 to avoid confusion.

A control arm 30a (FIG. 6) includes first and second members 32a and 34a. The first member 32a is identical to the first member 32 of the embodiment illustrated in FIGS. 1–4 and includes a first portion 42a defining a cylindrical housing 44a for connecting the control arm 30a to a vehicle frame. A second portion 56a defines a socket 58a for receiving a ball stud of a ball joint assembly to connect the control arm 30a to a steering knuckle. A curved connecting portion 64a interconnects the cylindrical housing 44a and the socket 58a.

The second member 34a includes a third portion 68a defining a cylindrical housing 70a for connecting the control arm 30a to the vehicle frame. A rod portion 84a extends from the cylindrical housing 70a and has a terminal end 86a rigidly connected to the connecting portion 64a of the first member 32a. An extension 88a extends from the terminal end 86a of the rod portion 84a into an opening in the connecting portion 64a.

The extension 88a may be threaded into the opening in the connecting portion 64a or press fit into the opening to rigidly connect the rod portion 84a to the connecting portion. After the extension 88a is rigidly connected to the connecting portion 64a, the terminal end 86a is welded to the connecting portion, or the connecting portion is crimped, or a jam nut is used, if the extension is threaded, to fixedly connect the rod portion 84a to the connecting portion, as discussed above in connection with the embodiments of FIGS. 4 and 5.

The rod portion 84a is bent or curved so that a longitudinal axis 102a of the cylindrical housing 70a does not extend perpendicular to or intersect a longitudinal axis 106a of the cylindrical housing 44a. The axis 102a of the cylindrical housing 70a extends to the left, as viewed in FIG. 6, of the axis 106a of the cylindrical housing 44a. An axis 100a of the rod portion 84a intersects an axis 104a of the socket 58a and extends perpendicular to the axis 104a. The axis 100a of the rod portion 84a intersects and extends perpendicular to the axis 102a of the cylindrical housing 70a. The axis 104a of the socket 58a extends parallel to the axis 106a of the cylindrical housing 70a.

The first portion 42a of the first member 32a is spaced a first distance from the second portion 56a. The third portion 68a of the second member 34a is spaced from the second portion 56a of the first member 32a a second distance smaller than the first distance between the first and second portions 42a and 56a of the first member. Accordingly, the connecting portion 64a of the first member 32a is substantially longer than the rod portion 84a of the second member 34a. When the control arm 30a is connected to the steering knuckle and the vehicle frame, the second member 34a normally receives compressive loads. Therefore, the rod portion 84a may have a simple construction.

Figure 7:
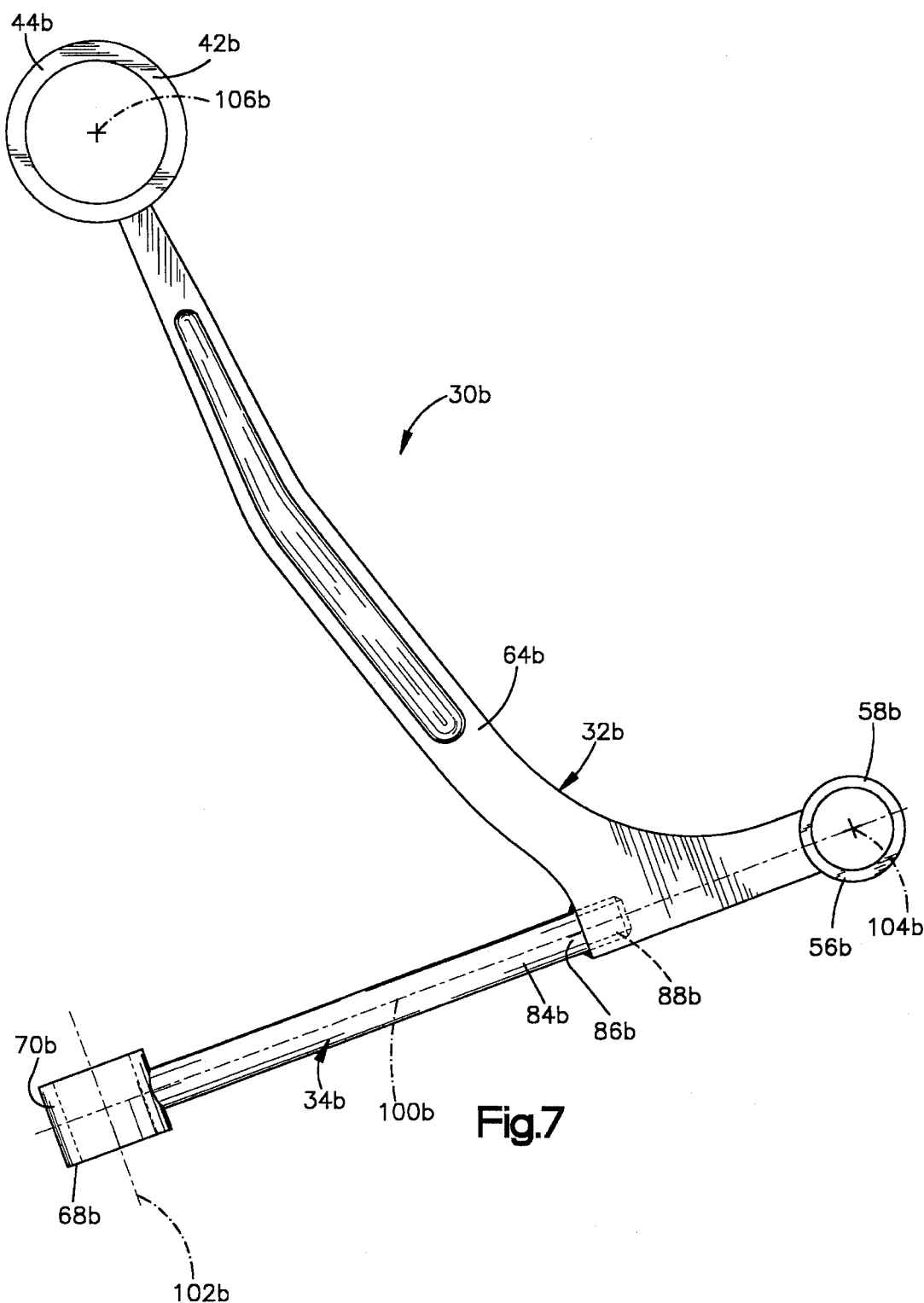
FIG. 7 is a top plan view of a fourth embodiment of a control arm, similar to FIG. 2.

In the embodiment of the invention illustrated in FIGS. 1–4, the axis 102 of the cylindrical housing 70 intersects and extends perpendicular to the axis 106 of the cylindrical housing 44. In the embodiment of the invention illustrated in FIG. 7, the axis of the cylindrical housing connected to the rod portion does not intersect or extend perpendicular to an axis of the cylindrical housing connected with the socket connectable to the steering knuckle. Since the embodiment of the invention illustrated in FIG. 7 is generally similar to the embodiment of the invention illustrated in FIGS. 1–4, similar numerals will be utilized to designate similar components, suffix letter "b" being associated with the numerals of FIG. 7 to avoid confusion.

A steering control arm 30b (FIG. 7) includes first and second members 32b and 34b. The first member 32b includes a first portion 42b defining a cylindrical housing 44b for connecting the control arm 30b to a vehicle frame. A second portion 56b of the first member 32b defines a socket 58b for receiving a ball stud of a ball joint assembly to connect the control arm 30b to a steering knuckle. A curved connecting portion 64b interconnects the cylindrical housing 44b and the socket 58b.

The second member 34b is identical to the second member 34 of the embodiment illustrated in FIGS. 1–4 and includes a third portion 68b defining a cylindrical housing 70b for connecting the control arm 30b to the vehicle frame. A rod portion 84b extends from the cylindrical housing 70b and has a terminal end 86b rigidly connected to the connecting portion 64b of the first member 32b. The terminal end 86b of the rod portion 84b has an extension 88b that extends into an opening in the connecting portion 64b of the first member 32b.

The extension 88b may be threaded into the opening in the connecting portion 64b or press fit into the opening to rigidly connect the rod portion 84b to the connecting portion. After the extension 88b is rigidly connected to the connecting portion 64b, the terminal end 86b is welded to the connecting portion, or the connecting portion is crimped, or a jam nut is used, if the extension is threaded, to fixedly connect the rod portion 84b to the connecting portion, as discussed above.

The rod portion 84b has a longitudinal axis 100b extending perpendicular to and intersecting a longitudinal axis 102b of the cylindrical housing 70b. The longitudinal axis 100b of the rod portion 84b extends perpendicular to and intersects a longitudinal axis 104b of the socket 58b. The axis 104b of the socket 58b extends parallel to a longitudinal axis 106b of the cylindrical housing 44b. The longitudinal axis 102b of the cylindrical housing 70b does not intersect or extend perpendicular to the longitudinal axis 106b of the cylindrical housing 44b. The rod portion 84b extends from the connecting portion 64b so that the longitudinal axis 102b of the cylindrical housing 70b extends to the left, as viewed in FIG. 7, of the longitudinal axis 106b of the cylindrical housing 44b. Accordingly, the connecting portion 64b of the member 32b has more of a curve as compared with the connecting portions disclosed in FIGS. 1–4 and FIG. 6.

The first portion 42b of the first member 32b is spaced a first distance from the second portion 56b. The third portion 68b of the second member 34b is spaced from the second portion 56b of the first member 32b a second distance smaller than the first distance between the first and second portions 42b and 56b of the first member. Accordingly, the connecting portion 64b of the first member 32b is substantially longer than the rod portion 84b of the second member 34b. When the control arm 30b is connected to the steering knuckle and the vehicle frame, the second member 34b normally receives compressive loads. Therefore, the rod portion 84b may have a simple construction.

Figure 8:
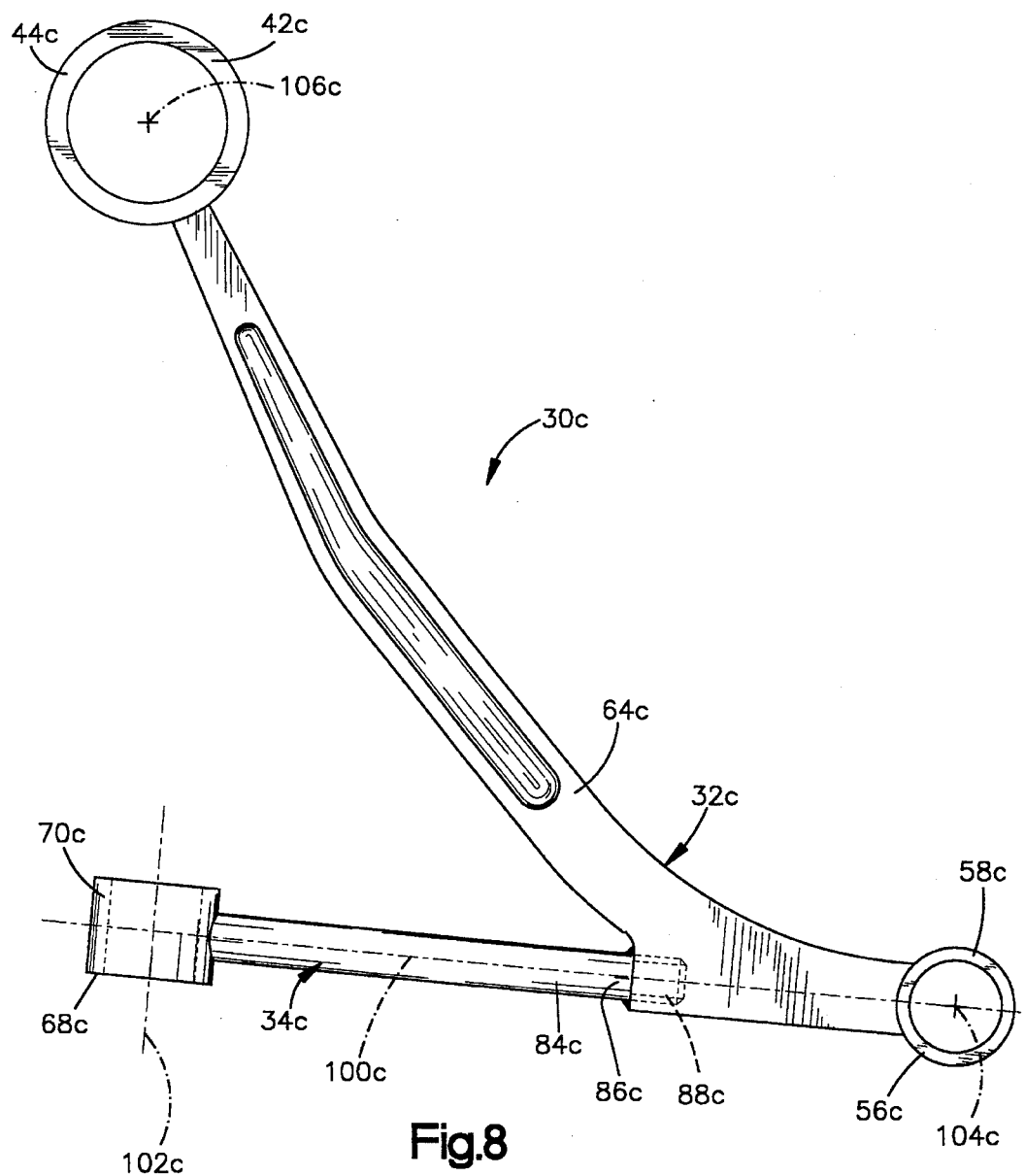
FIG. 8 is a top plan view of a fifth embodiment of a control arm, similar to FIG. 2.

In the embodiment of the invention illustrated in FIGS. 1–4, the longitudinal axis 102 of the cylindrical housing 70 intersects and extends perpendicular to the longitudinal axis 106 of the cylindrical housing 44. In the embodiment of the invention illustrated in FIG. 8, the longitudinal axis of the cylindrical housing connected with the rod portion does not intersect or extend perpendicular to a longitudinal axis of the cylindrical housing connected with the socket connectable to the steering knuckle. Since the embodiment of the invention illustrated in FIG. 8 is generally similar to the embodiment of the invention illustrated in FIGS. 1–4, similar numerals will be utilized to designate similar components, suffix letter "c" being associated with the numerals of FIG. 8 to avoid confusion.

A control arm 30c (FIG. 8) includes first and second members 32c and 34c. The first member 32c includes a first portion 42c defining a cylindrical housing 44c for connecting the control arm 30c to a vehicle frame. A second portion 56c of the member 32c defines a socket 58c for receiving a ball stud of a ball joint assembly for connecting the control arm 30c to a steering knuckle. A curved connecting portion 64c interconnects the cylindrical housing 44c and the socket 58c.

The second member 34c is identical to the second member 34 of the embodiment illustrated in FIGS. 1–4 and includes a portion 68c defining a cylindrical housing 70c for connecting the control arm 30c to the vehicle frame. A rod portion 84c extends from the cylindrical housing 70c and has a terminal end 86c rigidly connected to the connecting portion 64c of the first member 32c. An extension 88c extends from the terminal end 86c into an opening in the connecting portion 64c.

The extension 88c may be threaded or press fit into the opening in the connecting portion 64c to rigidly connect the rod portion 84c to the connecting portion. After the extension 88c is rigidly connected to the connecting portion 64c, the terminal end 88c is welded to the connecting portion, or the connecting portion is crimped, or a jam nut is used, if the extension is threaded, to fixedly connect the rod portion 84c to the connecting portion, as discussed above.

The rod portion 84c has a longitudinal axis 100c extending perpendicular to a longitudinal axis 102c of the cylindrical housing 70c. The longitudinal axis 100c of the rod portion 84c intersects and extends perpendicular to a longitudinal axis 104c of the socket 58c. The axis 104c of the socket 58c extends parallel to a longitudinal axis 106c of the cylindrical housing 44c. The longitudinal axis 102c of the cylindrical housing 70c does not intersect or extend perpendicular to the axis 106c of the cylindrical housing 44c. The rod portion 84c extends from the connecting portion 64c of the member 32c such that the axis 102c of the cylindrical housing 70c extends to the right, as viewed in FIG. 8, of the axis 106c of the cylindrical housing 44c. Accordingly, the connecting portion 64c has less of a curve as compared with the connecting portions disclosed in FIGS. 1–4 and 6.

The first portion 42c of the first member 32c is spaced a first distance from the second portion 56c. The third portion 68c of the second member 34c is spaced from the second portion 56c of the first member 32c a second distance smaller than the first distance between the first and second portions 42c and 56c of the first member. Accordingly, the connecting portion 64c of the first member 32c is substantially longer than the rod portion 84c of the second member 34c. When the control arm 30c is connected to the steering knuckle and the vehicle frame, the second member 34c normally receives compressive loads. Therefore, the rod portion 84c may have a simple construction.

Figure 9:
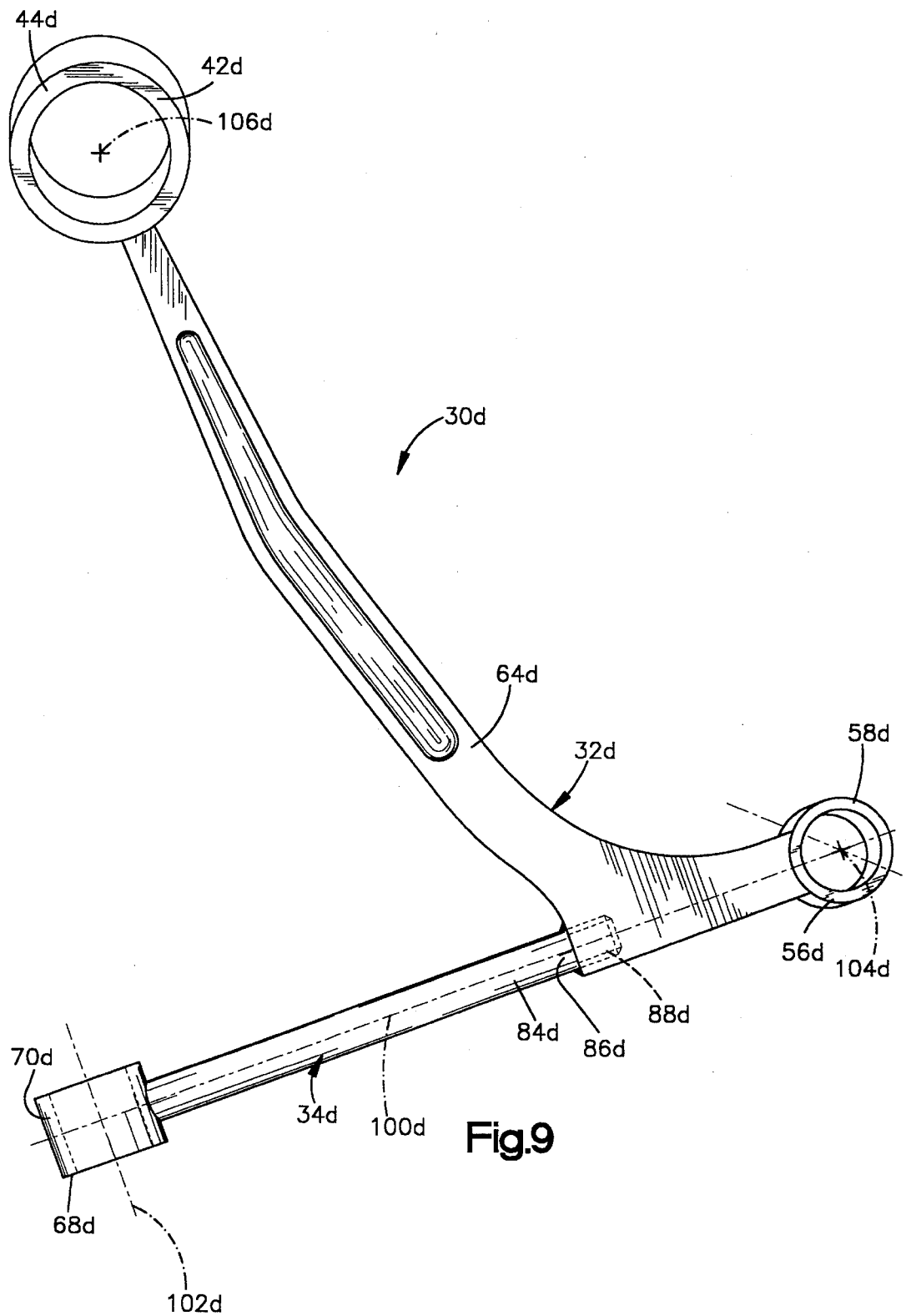
FIG. 9 is a top plan view of a sixth embodiment of a control arm, similar to FIG. 2.

In the embodiment of the invention illustrated in FIGS. 1–4, the longitudinal axis 106 of the cylindrical housing 44 extends parallel to the longitudinal axis 104 of the socket 58. In the embodiment of the invention illustrated in FIG. 9, the longitudinal axis of the cylindrical housing of the first member does not extend parallel to the longitudinal axis of the socket of the first member. Since the embodiment of the invention illustrated in FIG. 9 is generally similar to the embodiment of the invention illustrated in FIGS. 1–4, similar numerals will be utilized to designate similar components, suffix letter "d" being associated with the numerals of FIG. 9 to avoid confusion.

A control arm 30d (FIG. 9) includes first and second members 32d and 34d. The first member 32d includes a first portion 42d defining a cylindrical housing 44d for connecting the control arm 30d to a vehicle frame. A second portion 56d of the first member 32d defines a socket 58d for receiving a ball stud of a ball joint assembly to connect the steering control arm 30d to a steering knuckle. A curved connecting portion 64d interconnects the cylindrical housing 44d and the socket 58d.

The second member 34d is identical to the second member 34 of the embodiment illustrated in FIGS. 1–4 and includes a portion 68d defining a cylindrical housing 70d for connecting the control arm 30d to the vehicle frame. A rod portion 84d extends from the cylindrical housing 70d and includes a terminal end 86d rigidly connected to the connecting portion 64d of the first member 32d. An extension 88d extends from the terminal end 86d of the rod portion 84d into an opening in the connecting portion 64d.

The extension 88d is threaded into the opening in the connecting portion 64d or press fit into the opening to rigidly connect the rod portion 84d to the connecting portion. After the extension 88d is rigidly connected to the connecting portion 64d, the terminal end is welded to the connecting portion, or the connecting portion is crimped, or a jam nut is used, if the extension is threaded, to fixedly connect the rod portion 84d to the connecting portion, as discussed above.

The rod portion 84d has a longitudinal axis 100d that intersects and extends perpendicular to a longitudinal axis 102d of the cylindrical housing 70d. The longitudinal axis 100d of the rod portion 84d intersects a longitudinal axis 104d of the socket 58d and does not extend perpendicular to the axis 104d. The longitudinal axis 102d of the cylindrical housing 70d does not intersect or extend perpendicular to a longitudinal axis 106d of the cylindrical housing 44d. The longitudinal axis 104d of the socket 58d does not extend parallel to the longitudinal axis 106d of the cylindrical housing 44d. The rod portion 84d extends from the connecting portion 64d of the first member 32d such that the longitudinal axis 102d of the cylindrical housing 70d extends to the left, as viewed in FIG. 9, of the axis 106d of the cylindrical housing 44d.

The first portion 42d of the first member 32d is spaced a first distance from the second portion 56d. The third portion 68d of the second member 34d is spaced from the second portion 56d of the first member 32d a second distance smaller than the first distance between the first and second portions 42d and 56d of the first member. Accordingly, the connecting portion 64d of the first member 32d is substantially longer than the rod portion 84d of the second member. When the control arm 30d is connected to the steering knuckle and the vehicle frame, the second member 34d normally receives compressive loads. Therefore, the rod portion 84d may have a simple construction as compared to the connecting portion 64d of the first member 32d.

As can be seen from the various embodiments of the control arm, the axes of the cylindrical housings and the socket may extend in any number of directions relative to each other depending on the construction of the vehicle frame and steering knuckle. Also, the rod portion of any one of the embodiments may be bent or curved in any direction depending on the construction of the vehicle frame.

From the above description of the invention, those skilled in the art will perceive improvements, changes and modifications. Such improvements, changes and modifications within the skill of the art are intended to be covered by the appended claims.

Having described the invention, the following is claimed:

1. A control arm for use in a vehicle suspension system having a vehicle frame and a steering knuckle pivotable relative to the frame, said control arm comprising:

a first member including a first portion connectable to the vehicle frame, a second portion connectable to the steering knuckle, and a connecting portion interconnecting said first and second portions;

a second member including a third portion connectable to the vehicle frame and a rod portion extending from said third portion, said rod portion including a terminal end connected to said connecting portion of said first member;

means for rigidly connecting said terminal end of said rod portion to said connecting portion of said first member to prevent relative movement between said first and second members, said means including a threaded extension extending from said terminal end of said rod portion received in a threaded opening in said connecting portion of said first member.

2. A control arm as set forth in claim 1 wherein said means for rigidly connecting said terminal end of said rod portion to said connecting portion of said first member includes an opening in one of said terminal end and said connecting portion and an extension extending from the other of said terminal end and said connecting portion.

3. A control arm as set forth in claim 2 wherein said opening is in said connecting portion of said first member and said extension extends from said terminal end of said rod portion.

4. A control arm as set forth in claim 3 wherein said terminal end of said rod portion includes a shoulder from which said extension extends, said shoulder engaging a surface of said connecting portion of said first member.

5. A control arm as set forth in claim 3 further including means for fixedly connecting said terminal end of said rod portion to said connecting portion.

6. A control arm as set forth in claim 1 further including means for fixedly connecting said terminal end of said rod portion to said connecting portion.

7. A control arm as set forth in claim 1 wherein one of said first and second members has an I-beam shaped portion.

8. A control arm as set forth in claim 1 wherein said connecting portion of said first member has an I-beam shaped portion.

9. A control arm as set forth in claim 1 wherein said connecting portion of said first piece is curved.

10. A control arm as set forth in claim 1 wherein said rod portion is bent.

11. A control arm as set forth in claim 1 wherein said first portion of said first member includes means for defining a first cylindrical housing, said second portion of said first member including means for receiving a ball stud of a ball joint assembly connectable to the steering knuckle, said third portion of said second member including means for defining a second cylindrical housing.

12. A control arm as set forth in claim 11 wherein said rod portion of said second member has a longitudinal axis extending perpendicular to a longitudinal axis of said second cylindrical housing and intersecting a longitudinal axis of said receiving means of said first member.

13. A control arm as set forth in claim 12 wherein the axis of said rod portion extends perpendicular to the axis of said receiving means, the longitudinal axis of said second cylindrical housing extending perpendicular to a longitudinal axis of said first cylindrical housing, the axis of said first cylindrical housing extending parallel to the axis of said receiving means.

14. A control arm as set forth in claim 1 wherein said first member comprises one metal piece.

15. A control arm as set forth in claim 1 wherein said first and second portions of said first member are spaced apart a first distance, said third portion of said second member being spaced from said second portion of said first member a second distance smaller than the first distance.

16. A control arm as set forth in claim 1 wherein said connecting portion of said first member is substantially longer than said rod portion of said second member.

17. A control arm for use in a vehicle suspension system having a vehicle frame and a steering knuckle pivotable relative to the frame, said control arm comprising:

a first member including a first portion connectable to the vehicle frame, a second portion connectable to the steering knuckle, and a connecting portion interconnecting said first and second portions;

a second member including a third portion connectable to the vehicle frame and a rod portion extending from said third portion, said rod portion including a terminal end connected to said connecting portion of said first member;

said first and second portions of said first member being spaced apart a first distance, said third portion of said second member being spaced from said second portion of said first member a second distance smaller than the first distance; and means for connecting said terminal end of said rod portion to said connecting portion of said first member, said means for connecting said terminal end of said rod portion to said first member including an extension extending from said terminal end of said rod portion received in an opening in said connecting portion of said first member to rigidly connect said rod portion to said connecting portion to prevent relative movement between said first and second members.

18. A control arm as set forth in claim 17 further including means for fixedly connecting said terminal end of said rod portion to said connecting portion of said first member.

19. A control arm as set forth in claim 17 wherein said connecting portion of said first member has an I-beam shaped portion.

20. A control arm as set forth in claim 17 wherein said connecting portion of said first member is curved.

21. A control arm as set forth in claim 17 wherein said connecting portion of said first member is substantially longer than said rod portion of said second member.

22. A control arm as set forth in claim 1 wherein only said first portion of said first member and said third portion of said second member of said control arm are connectable to the vehicle frame.

\* \* \* \* \*